United States Patent
Iida et al.

(10) Patent No.: US 9,207,074 B2
(45) Date of Patent: Dec. 8, 2015

(54) DISTANCE MEASUREMENT APPARATUS, AND DISTANCE MEASUREMENT METHOD

(71) Applicant: FUJITSU LIMITED, Kawasaki-shi, Kanagawa (JP)

(72) Inventors: Koichi Iida, Kobe (JP); Koichi Tezuka, Kobe (JP)

(73) Assignee: FUJITSU LIMITED, Kawasaki (JP)

( * ) Notice: Subject to any disclaimer, the term of this patent is extended or adjusted under 35 U.S.C. 154(b) by 27 days.

(21) Appl. No.: 14/100,337

(22) Filed: Dec. 9, 2013

(65) Prior Publication Data

US 2014/0168630 A1    Jun. 19, 2014

(30) Foreign Application Priority Data

Dec. 19, 2012    (JP) .................. 2012-276573

(51) Int. Cl.
  *G01C 3/00*    (2006.01)
  *G01C 3/08*    (2006.01)
  *G01S 17/93*   (2006.01)
  *G01S 17/42*   (2006.01)

(52) U.S. Cl.
  CPC . *G01C 3/08* (2013.01); *G01S 17/42* (2013.01); *G01S 17/936* (2013.01)

(58) Field of Classification Search
  CPC .......... G01B 11/026; G01C 3/02; G01C 3/32; G01C 3/08; G01C 3/22
  USPC .......................................................... 356/3
  See application file for complete search history.

(56) References Cited

U.S. PATENT DOCUMENTS

| 4,477,184 | A  |   | 10/1984 | Endo |
| 5,699,151 | A  | * | 12/1997 | Akasu .................. 356/5.01 |
| 2006/0215148 | A1 |   | 9/2006 | Yamaguchi et al. |
| 2006/0244978 | A1 |   | 11/2006 | Yamada et al. |
| 2011/0196568 | A1 | * | 8/2011 | Nickolaou et al. ......... 701/29 |
| 2013/0242285 | A1 | * | 9/2013 | Zeng ..................... 356/28 |

FOREIGN PATENT DOCUMENTS

| JP | 3-176685   | 7/1991 |
| JP | 11-202051  | 7/1999 |
| JP | 2006-258604 | 9/2006 |

(Continued)

OTHER PUBLICATIONS

Extended European Search Report dated Feb. 12, 2014 in European Patent Application No. 13197781.1-1811.

(Continued)

*Primary Examiner* — Tarifur Chowdhury
*Assistant Examiner* — Md Rahman
(74) *Attorney, Agent, or Firm* — Staas & Halsey LLP

(57) ABSTRACT

A distance measurement method, includes measuring a distance to an object by means of a distance measurement circuit of a distance measurement apparatus and by scanning a light beam; designating a first mode which controls a projection angle of the light beam so that sampling positions in a given number of successive scans do not overlap, when the distance to the object is greater than or equal to a threshold value, by using the processor; and designating a second mode which controls the projection angle of the light beam so that the sampling positions overlap in each scan, when the distance to the object is less than the threshold value, by using the processor.

14 Claims, 21 Drawing Sheets

(56) References Cited

FOREIGN PATENT DOCUMENTS

| JP | 2007-278940 | 10/2007 |
|----|-------------|---------|
| JP | 2011-2368   | 1/2011  |

OTHER PUBLICATIONS

Korean Office Action dated Nov. 26, 2014 in Korean Patent Application No. 10-2013-0157288.

\* cited by examiner

FIG. 11

| | MIRROR ANGLE (deg) | PROJECTION ANGLE (deg) | n=1 | n=2 | n=3 | | n=N |
|---|---|---|---|---|---|---|---|
| N ITEMS | θ1 | θ1 | ● | | | | |
| | θ2 | θ2 | | ● | | | |
| | θ3 | θ3 | | | ● | | |
| | ⋮ | ⋮ | | | | | |
| | θN | θN | | | | | ● |
| | ⋮ | ⋮ | | | | | |
| N ITEMS | θA-(N-1) | θA-(N-1) | ● | | | | |
| | θA-(N-2) | θA-(N-2) | | ● | | | |
| | θA-(N-3) | θA-(N-3) | | | ● | | |
| | ⋮ | ⋮ | | | | | |
| | θA | θA | | | | | ● |

FIG. 15

| | MIRROR ANGLE (deg) | PROJECTION ANGLE (deg) | CLOCK COUNT | n=1 | n=2 | n=3 | | n=N |
|---|---|---|---|---|---|---|---|---|
| N ITEMS { | θ1 | Θ1 | T1 | ● | | | | |
| | θ2 | Θ2 | T2 | | ● | | | |
| | θ3 | Θ3 | T3 | | | ● | | |
| | ⋮ | ⋮ | ⋮ | | | | | |
| | θN | ΘN | TN | | | | | ● |
| | ⋮ | ⋮ | ⋮ | | | | | |
| N ITEMS { | θA-(N-1) | ΘA-(N-1) | TA-(N-1) | ● | | | | |
| | θA-(N-2) | ΘA-(N-2) | TA-(N-2) | | ● | | | |
| | θA-(N-3) | ΘA-(N-3) | TA-(N-3) | | | ● | | |
| | ⋮ | ⋮ | ⋮ | | | | | |
| | θA | ΘA | TA | | | | | ● |

FIG. 17

| MIRROR ANGLE (deg) | PROJECTION ANGLE (deg) | CLOCK COUNT | n=1 | n=2 | n=3 | | n=N |
|---|---|---|---|---|---|---|---|
| θ1 | Θ1 | T1 | ● | | | | |
| θ2 | Θ2 | T2 | | ● | | | |
| θ3 | Θ3 | T3 | | | ● | | |
| ⋮ | ⋮ | ⋮ | | | | | |
| θN | ΘN | TN | | | | | ● |
| ⋮ | ⋮ | ⋮ | | | | | |
| θA-(N-1) | ΘA-(N-1) | TA-(N-1) | ● | | | | |
| θA-(N-2) | ΘA-(N-2) | TA-(N-2) | | ● | | | |
| θA-(N-3) | ΘA-(N-3) | TA-(N-3) | | | ● | | |
| ⋮ | ⋮ | ⋮ | | | | | |
| θA | ΘA | TA | | | | | ● |
| | | | | | | | |
| θA | ΘA | TA' | | | | | |
| ⋮ | ⋮ | ⋮ | | | | | |
| θA-(N-3) | ΘA-(N-3) | TA-(N-3)' | | | | | |
| θA-(N-2) | ΘA-(N-2) | TA-(N-2)' | | | | | |
| θA-(N-1) | ΘA-(N-1) | TA-(N-1)' | | | ● | | |
| ⋮ | ⋮ | ⋮ | | | | | |
| θN | ΘN | TN' | | | | | |
| ⋮ | ⋮ | ⋮ | | | | | |
| θ3 | Θ3 | T3' | | | | | |
| θ2 | Θ2 | T2' | | | | | |
| θ1 | Θ1 | T1' | | | | | |

DISTANCE MEASUREMENT APPARATUS, AND DISTANCE MEASUREMENT METHOD

CROSS-REFERENCE TO RELATED APPLICATION

This application is based upon and claims the benefit of priority from the prior Japanese Patent Application No. 2012-276573 filed on Dec. 19, 2012, the entire contents of which are incorporated herein by reference.

FIELD

The present disclosure relates to a distance measurement apparatus, a distance measurement method, and a distance measurement program.

BACKGROUND

A laser measurement apparatus (for example, a laser radar), which is an example of a distance measurement apparatus, is not limited to measuring the distance to a target from a person measuring, and is used, for example, to detect an obstacle from a vehicle, detecting the presence of a person between a carriage and an sliding door on a railway station platform, and in a monitoring system.

For a laser measurement apparatus, there is a one-dimensional scanning scheme and a two-dimensional scanning scheme. In the one-dimensional scanning scheme, the direction of the projection of the laser beam is varied on a single plane while projecting the laser beam at a given time interval and thus, scanning may be performed on a single plane at a given angular interval. The two-dimensional scanning scheme may be implemented by, for example, performing the one-dimensional scanning sequentially on plural planes. The distance to an object may be calculated using either one of the one-dimensional scanning scheme and the two-dimensional scanning scheme by, for example, measuring the time of flight (TOF), which is the round-trip time taken for a projected laser beam to reach a target, be reflected, and return, and then multiplying the TOF by the speed of light and dividing the result thereof by two.

When a surrounding environment is being monitored by using a laser measurement apparatus from a vehicle, for example, when the vehicle is driving forward on a road, it is desirable that an angular interval which controls the projection angle of the laser beam is comparatively narrow and a scanning angle resolution is high in order to easily detect an obstacle ahead of the vehicle. However, for example when the vehicle is travelling backwards to park the vehicle, because the vehicle is reversing a relatively slow speed, it is desirable that the accuracy of a measurement device is set to be high so that the vehicle does not contact, for example, an obstacle behind the vehicle. In other words, the accuracy of measuring distance desired when, for example, the vehicle is travelling forward, because the distance to an object being measured is relatively long and there is a time to spare, the accuracy desired for distance measurement may be lower than the accuracy for distance measurement when, for example, the vehicle is being parked and the distance to an object being measured is relatively small. However, in order to make the accuracy of a measured distance higher, for example, simply widening the angular interval which controls the projection angle of the laser beam will not a produce a high scanning angle resolution.

Circuit noise is known as a cause that reduces the accuracy of a measured distance. Accordingly, in an effort to reduce the noise, a method in which a noise countermeasure is used in a circuit that calculates a measured distance may be considered. However, a complicated circuit is needed and thus, the cost for the distance measurement apparatus increases. Alternatively, a method in which samplings of the TOFs are repeated and averaged to improve the accuracy of a measured distance may be considered. However, in this case, since an update of distance data is delayed by the number of samples subjected to averaging, it takes a relatively longer time to calculate the measured distance. In order to reduce the time required to update the distance data, it is desirable to significantly narrow the angular interval which controls the projection angle of the laser beam as well as to shorten the time interval over which the laser beam is projected. However, a laser, which has a very short time interval (that is, the light emitting interval) over which a laser beam is projected, and an associated driving circuit is expensive. Accordingly, an expensive and complicate circuit may be needed to significantly narrow the angular interval which controls the projection angle of the laser beam and thus, the cost for the distance measurement apparatus increases.

As described above, there is a tradeoff between the accuracy of a measured distance and the scanning angle resolution in a conventional distance measurement apparatus and thus, it is difficult to improve the accuracy of a measured distance without sacrificing the scanning angle resolution and also difficult to improve the scanning angle resolution without sacrificing the accuracy of a measured distance. As the prior art documents, see, for example, Japanese Patent Application Laid-Open No. 2007-278940, Japanese Patent Application Laid-Open No. H3-176685, Japanese Patent Application Laid-Open No. 2011-2368, and Japanese Patent Application Laid-Open No. H11-202051.

It is difficult to improve the accuracy of a measured distance and the scanning angle resolution with a relatively simple circuit in a conventional distance measurement apparatus.

Accordingly, the present disclosure intends to provide a distance measurement apparatus, a distance measurement method and a program thereof that are capable of improving the accuracy of a measured distance and the scanning angle resolution with a relatively simple circuit.

SUMMARY

According to an aspect of the present disclosure, there is provided a distance measurement method, including measuring a distance to an object by means of a distance measurement circuit of a distance measurement apparatus and by scanning a light beam, designating a first mode which controls a projection angle of the light beam so that sampling positions in a given number of successive scans do not overlap, when the distance to the object is greater than or equal to a threshold value, by using the processor, and designating a second mode which controls the projection angle of the light beam so that the sampling positions overlap in each scan, when the distance to the object is less than the threshold value, by using the processor.

The object and advantages of the invention will be realized and attained by means of the elements and combinations particularly pointed out in the claims. It is to be understood that both the foregoing general description and the following detailed description are exemplary and explanatory, and are not restrictive of the invention, as claimed.

According to the disclosed distance measurement apparatus, the distance measurement method and the program therefor, the accuracy of a measured distance and a scanning angle resolution may be improved with a relatively simple circuit.

BRIEF DESCRIPTION OF DRAWINGS

FIG. 11 is a view illustrating an example of a table of light emitting patterns in the fourth embodiment.

FIG. 15 is a view illustrating an example of a table of light emitting patterns according to a fifth embodiment.

FIG. 17 is a view illustrating another example of the table of light emitting patterns in the fifth embodiment.

DESCRIPTION OF EMBODIMENTS

In the disclosed distance measurement apparatus, distance measurement method, and program therefor, a distance to an object is measured with a light beam scanning. When the measured distance is greater than or equal to a threshold value, a first mode is designated which controls the projection angle of a light beam such that the sampling positions in a given number of successive scans do not overlap by performing downsampling. When the measured distance is less than the threshold value, a second mode is designated which controls the projection angle of a light beam such that the sampling position for each scan overlaps. Priority may be given to the scanning angle resolution in the first mode and priority may be given to the accuracy of a measured distance in the second mode.

Hereinbelow, each embodiment of the distance measurement apparatus, distance measurement method, and the program therefor will be described with reference to the accompanying drawings.

First Embodiment

Figure 1:
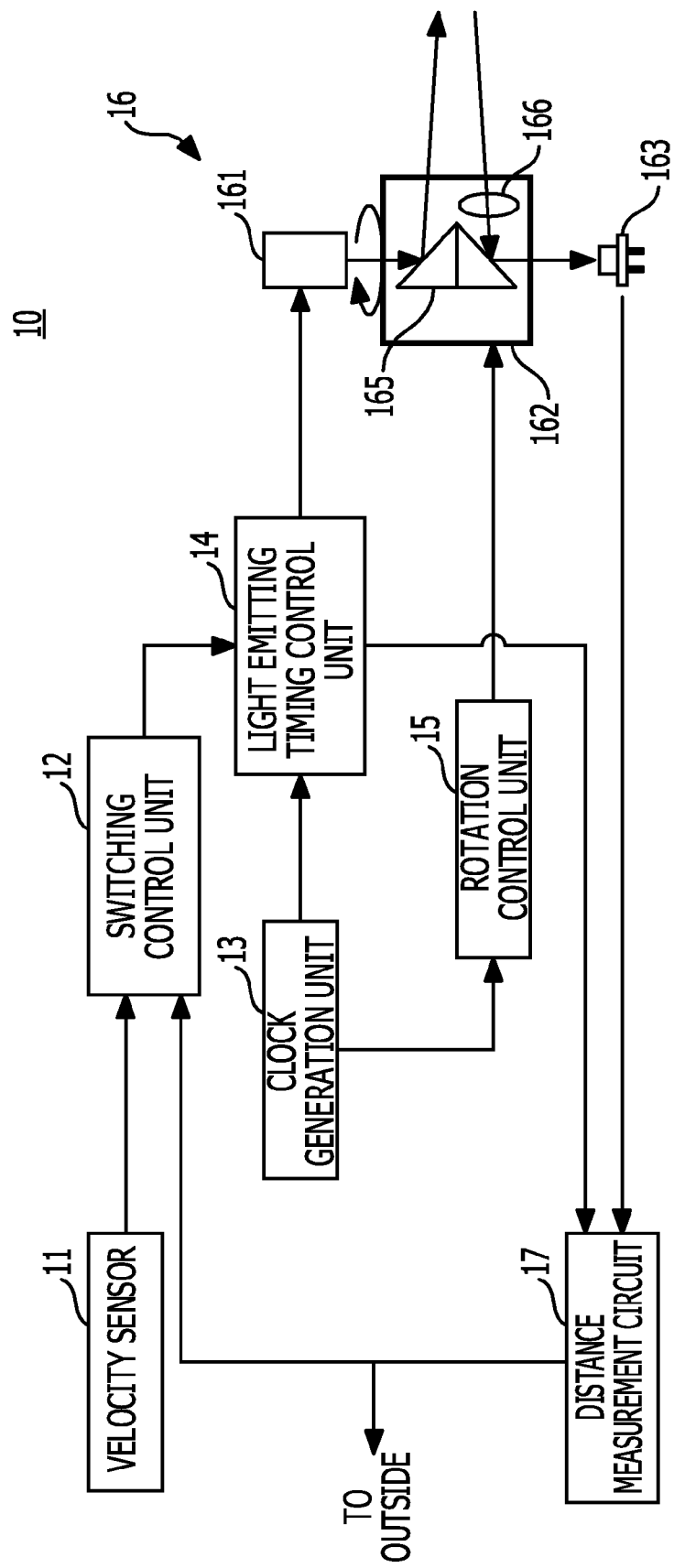
FIG. 1 is a view illustrating an example of a distance measurement apparatus according to a first embodiment.

FIG. 1 is a view illustrating an example of a distance measurement apparatus according to a first embodiment. In the present embodiment a one-dimensional scanning scheme is employed using a laser, which is an example of a light beam.

The distance measurement apparatus 10 illustrated in FIG. 1 includes a speed sensor 11, a switching control unit 12, a clock signal generation unit 13, a light emission timing control unit 14, a rotation control unit 15, a light input/output unit 16, and a distance measurement circuit 17. The light input/output unit 16 includes a laser diode (LD) and LD driving unit 161, a mirror driving unit 162, and a photo-diode (PD). The LD is an example of a light source (that is, a light emitting unit) and the PD is an example of a light detection unit (that is, a light receiving unit). The mirror driving unit 162 is an example of an optical scanning unit and has a well-known configuration, such as being provided with a rotating mirror 165 and a motor (not illustrated), which rotates the rotating mirror 165, and may include a condensing lens 166.

On the basis of a clock signal supplied from the clock signal generation unit 131, the light emission timing control unit 14 outputs a light emitting control signal, which controls a light emitting timing of the LD, to the LD driving unit of the LD and LD driving unit 161 at a light emitting timing according to a mode indicated by a switching signal supplied from the switching control unit 12. The rotation control unit 15 outputs a rotation control signal, which controls rotation of the rotating mirror 165, to the mirror driving unit 162 based on a clock signal supplied from the clock signal generation unit 131. A laser beam projected from the LD of the LD and LD driving unit 161 is reflected from the rotating mirror 165 and projected from the mirror driving unit 162 at a projection angle according to a light emitting timing to scan a single plane. The laser beam reflected from an object (not illustrated) is detected by the PD 163 through the condensing lens 166, and a detection signal output from the PD 163 is supplied to the distance measurement circuit 17. The distance measurement circuit 17 may calculate the distance to the object by measuring a round trip time that is taken for the projected laser beam which is reflected off and returned from the object and multiplying the measured round trip time by the speed of light (for example, a TOF scheme), based on the detection signal and the light emitting control signal supplied from the light emission timing control unit 14. The distance data calculated by the distance measurement circuit 17 is supplied to the switching control unit 12 and is also output to, for example, an external device (not illustrated). The switching control unit 12 outputs a switching signal which designates a first mode or a second mode based on at least the distance data.

In FIG. 1, the speed sensor 11 is provided to detect the speed of the distance measurement apparatus 10 (that is, the speed of, for example, a vehicle mounted with the distance measurement apparatus 10) and supply speed data indicating the detected speed to the switching control unit 12. The switching control unit 12 may perform control to switch to the first mode or the second mode in consideration of the speed data, for example, similarly to a third embodiment which will be described later. The speed sensor 11 may be externally connected to the distance measurement apparatus 10. When the switching control of the mode that gives consideration to the speed data is not performed, the speed sensor 11 may be omitted.

Figure 2:
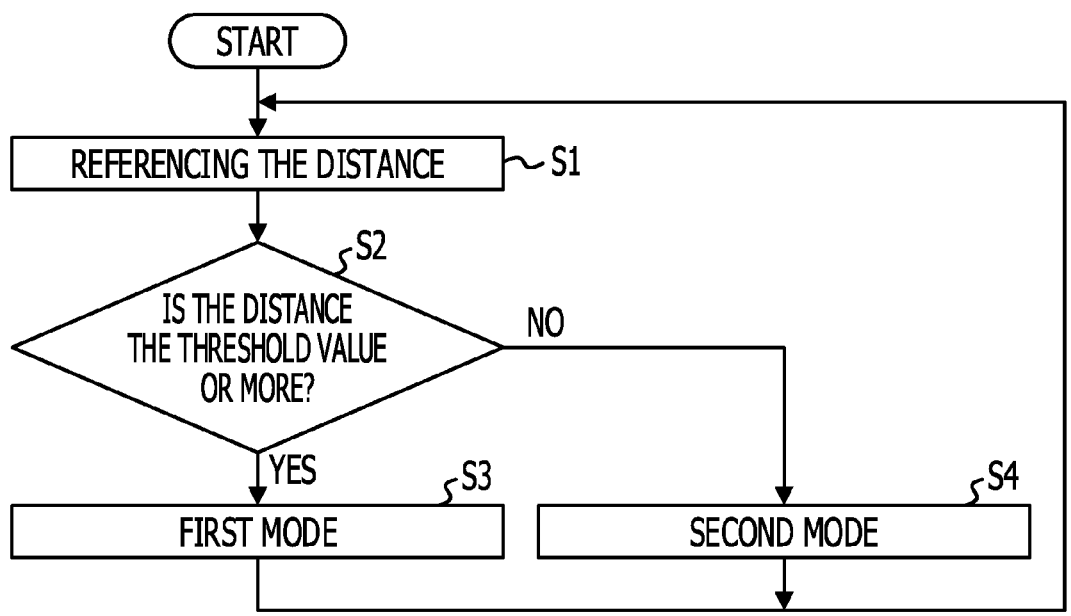
FIG. 2 is a flowchart explaining the operations of the first embodiment.

FIG. 2 is a flowchart explaining the operations of the first embodiment. In FIG. 2, the switching control unit 12 refers to distance data supplied from the distance measurement circuit 17 at step S1 and determines whether a distance indicated by the distance data is greater than or equal to the threshold value at step S2. The threshold value may be stored in a storage unit (not illustrated) installed within the distance measurement circuit 17, or a storage unit (not illustrated) installed externally and accessible by the distance measurement circuit 17, or may be input to the distance measurement circuit 17 from an external source. In this case, the distance data may be referred to for a given time to determine whether the shortest distance indicated by the distance data within the given time is greater than or equal to the threshold value. When the determination result at step S2 is "YES", the switching control unit 12 supplies the switching signal which designates a light emitting timing for the first mode to the light emission timing control unit 14 at step S3 and the process goes back to step S1. However, when the determination result at step S2 is "NO", the switching control unit 12 supplies a switching signal which designates a light emitting timing for the second mode to the light emission timing control unit 14 at step S4 and the process goes back to step S1.

As will be described below, the first mode is a mode in which priority is given to the scanning angle resolution, and when the measured distance is greater than or equal to the threshold value, the projection angles of laser beam are arranged to deviate so that sampling positions in a given number of successive scans do not overlap. In contrast, the second mode is a mode in which priority is given to the accuracy of a measured distance, and when the measured distance is less than the threshold value, the projection angles of laser beam is controlled such that sampling positions for each scan overlap.

Figure 3:
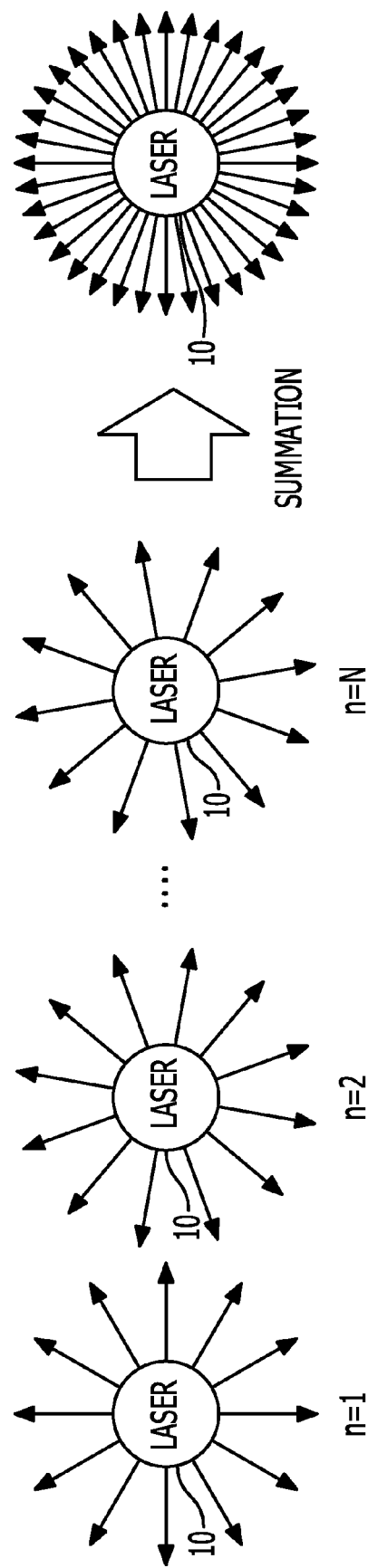
FIG. 3 is a view explaining sampling when priority is given to scanning angle resolution.

FIG. 3 is a view explaining sampling when priority is given to scanning angle resolution. In FIG. 3, an arrow extending radially from the distance measurement apparatus 10 indicates a projection angle of the laser beam on a single plane. Accordingly, the arrow extending radially corresponds to a projection timing of the laser beam and an adjacent arrow represents a sampling interval (or timing). In the first mode illustrated in FIG. 3, sampling for which the sampling interval is set to every N points and the number of samples is A/N samples is performed for N (N is an integer 2 (two) or more) laps. In a second lap (n=2) after a first lap (n=1), sampling for which sample points are deviated from those in the first lap and the sampling interval is set to every N points is performed. That is, in the n-th lap (n=1, 2, . . . , N), sampling, for which the projection angle of the laser beam is deviated to make the sample points deviate from those in the (n−1)th lap and the sampling interval is set to every N points, is performed similarly to the example as described above. For example, an initial sample point may be deviated between the n-th lap and the (n−1)th lap. A method that makes the sample points deviate in the first lap to the n-th lap such that the sampling positions are not overlapped is not particularly limited. The point is that any method of making the sample points deviate may be employed as long as the number of samples becomes A samples when the results (that is, the distance data) of downsampling for N laps are added as illustrated in the right-side of FIG. 3. Accordingly, when the number of rotations of the rotating mirror 165 is set to N times of the number of rotation which corresponds to a case where the number of samples for one lap is A/N samples, the number of samples when the results (for example, the distance data) of sampling for N laps are added becomes the same A samples as illustrated in the right-side of FIG. 3. The distance measurement circuit 17 calculates a distance based on the samples in which the results of the sampling for N laps are added.

Figure 4:
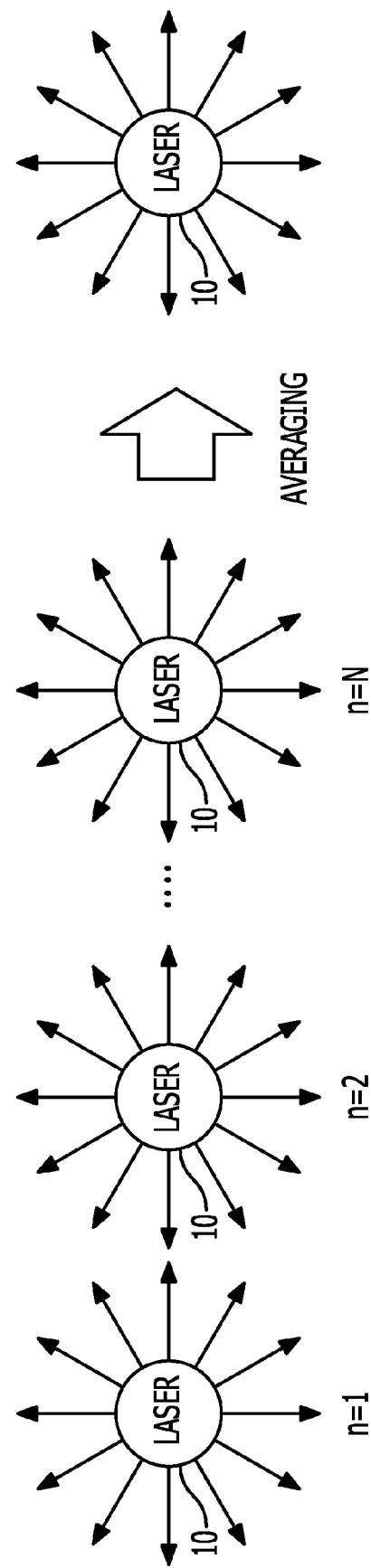
FIG. 4 is a view explaining sampling when priority is given to accuracy for a measured distance.

FIG. 4 is a view explaining sampling when priority is given to the accuracy of a measured distance. In FIG. 4, an arrow extending radially from the distance measurement apparatus 10 indicates a projection angle of the laser beam on a single plane. Accordingly, a radially extending arrow corresponds to an emission timing of the laser beam and an adjacent arrow represents a sampling interval (in other words, a time interval). In the second mode illustrated in FIG. 4, sampling for which the sampling interval is set to every N points and the number of samples is A/N samples is performed for N laps where N is, for example, an integer equal to 2 or more. In a second lap (n=2) after a first lap (n=1), sampling for which sample points are overlapped with (that is, match) those in the first lap and the sampling interval is set to every N points is performed. That is, in a first lap to a n-th lap, sampling for which the projection angles of the laser beam coincide with each other to overlap the sample points in the respective laps and the sampling interval is set to every N points is performed similarly to the example as described above. Further, the distance measurement circuit 17 may obtain an average value of the resulting distance data of the sampling for N laps and uses the obtained average as the distance data to further enhance the accuracy of a measured distance as illustrated in the right-side of FIG. 4.

As described above, when the measured distance to the object is greater than or equal to the threshold value, the mode is switched to the first mode in which priority is given to the scanning angle resolution, and when the distance is less than the threshold value, the mode is switched to the second mode in which priority is given to the accuracy of a measured distance. Accordingly, a measurement may be performed according to the measurement environment of the distance measurement apparatus 10.

FIG. 3 and FIG. 4 illustrate a case where the projection angle of the laser beam on one plane is 360 degrees, but the projection angle of the laser beam may be in a range between more than 0 (zero) degree and less than or equal to 360 degrees, for example, 180 degrees.

A laser apparatus having a laser beam with a very short light emitting interval is expensive. However, the LD used to implement the first and second modes does not need to have a very short light emitting interval and thus, the laser apparatus may be formed using a relatively cheap LD. Further, an expensive and complicated circuit is needed to significantly narrow an angular interval which controls the projection angle of the laser beam, but a circuit (for example, the switching control unit 12 which generates the switching signal, the light emission timing control unit 14 which generates the light emitting control signal) used to implement the first and second modes does not need to significantly narrow the angular interval which controls the projection angle of the laser beam and thus, the laser may be formed with a relatively less expensive circuit. Accordingly, the first and second modes may be implemented without significantly increasing the cost of the distance measurement apparatus 10.

Second Embodiment

A distance measurement apparatus in a second embodiment may have the same configuration as that of FIG. 1. The distance measurement apparatus according to the second embodiment adopts a scanning scheme in which a one-dimensional scanning is employed using a laser which is an example of a light beam.

Figure 5:
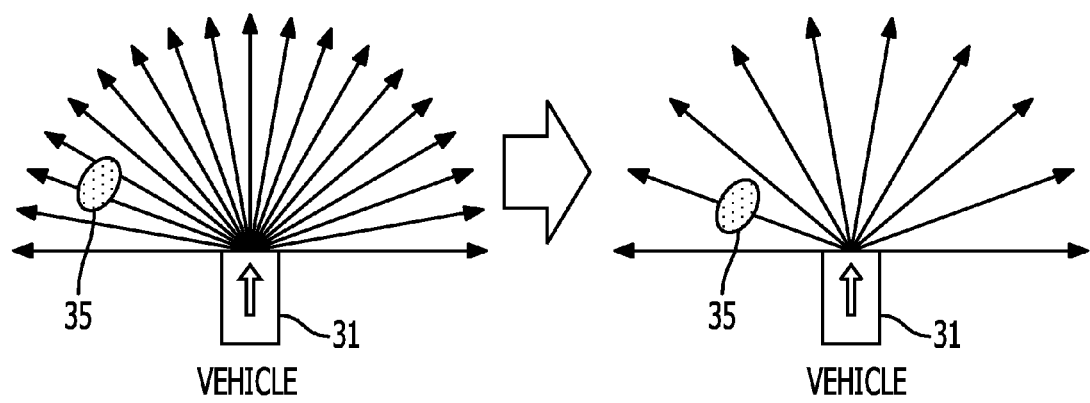
FIG. 5 is a view explaining the operations when distances of a plurality of objects are measured according to a second embodiment.

FIG. 5 is a view explaining the operations when the distances of a plurality of objects are measured in a second embodiment. It is assumed that the vehicle 31 illustrated in FIG. 5 is mounted with the distance measurement apparatus 10 illustrated in FIG. 1 and is driven in the direction of the arrow. The left-side of FIG. 5 indicates a case where the distance measurement apparatus 10 scans the object 35 in the first mode in which scans for N laps are overlapped. In this example, when the distance to the object 35 is less than or equal to the threshold value in two successive samples, the distance measurement apparatus 10 is switched into the second mode as illustrated in the right-side of FIG. 5.

Figure 6:
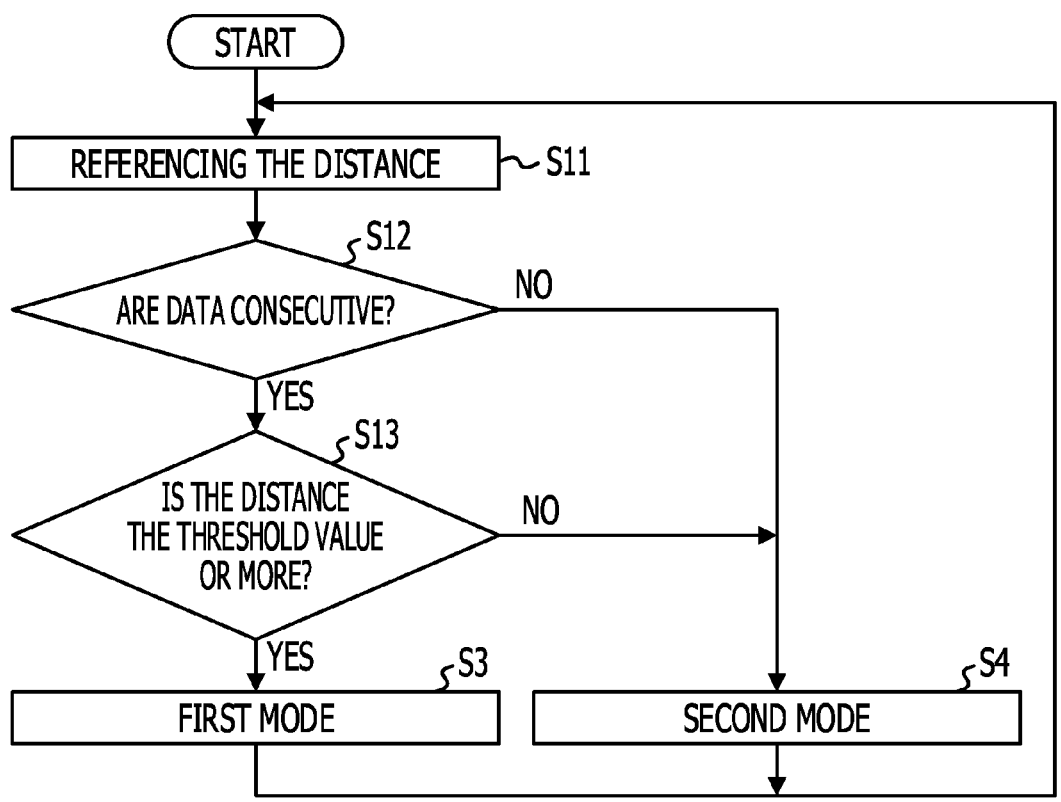
FIG. 6 is a flowchart explaining the operations of the second embodiment.

FIG. 6 is a flowchart explaining the operations of the second embodiment. In FIG. 6, the same steps as those of FIG. 2 are given to similar reference numerals and description thereof is omitted. In FIG. 6, the switching control unit 12 refers to the distance data supplied from the distance measurement circuit 17 at step S11 and determines whether the distance data are for successive data, that is, whether the distance data is data for successive sample points, at step S12. When the determination result at step S12 is "YES", the switching control unit 12 determines whether both distances indicated by the two successive distance data are greater than or equal to the threshold value at step S13. In this case, the switching control unit 12 may refer to the distance data for a given time to obtain the shortest piece of distance data and the second shortest piece of distance data at step S11, and determine whether the shortest piece of distance data and the second shortest piece of distance data are successive distance data at step S12. When the determination result at step S13 is "YES", the switching control unit 12 supplies a switching signal which designates the light emitting timing for the first mode to the light emission timing control unit 14 at step S3. However, when the determination result at step S12 or step S13 is "NO", the switching control unit 12 supplies a switching signal which designates the light emitting timing for the second mode to the light emission timing control unit 14 at step S4.

According to the present embodiment, even though the mode is switched into the second mode and thus, the sampling interval becomes wider than the sampling interval when scans are overlapped for N laps, the distance to the object 35 may be reliably measured without losing track of the object 35.

Third Embodiment

A distance measurement apparatus in a third embodiment may have the same configuration as in FIG. 1. The distance measurement apparatus according to the third embodiment adopts a scanning scheme in which a one-dimensional scanning is employed using a laser which is an example of a light beam.

Figure 7:
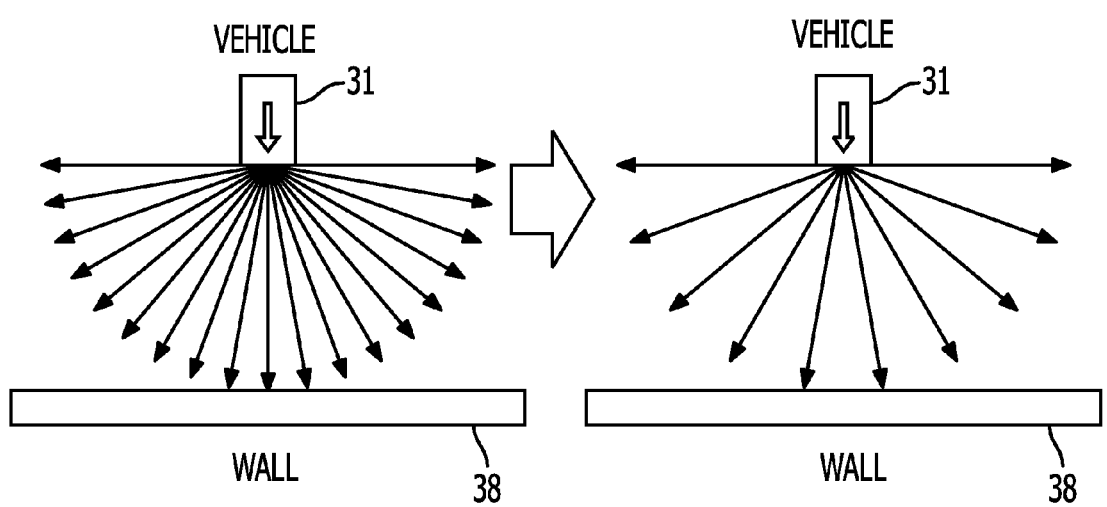
FIG. 7 is a view explaining the operations according to a third embodiment when a distance is measured after giving consideration to speed.

FIG. 7 is a view explaining the operations in a third embodiment when a distance is measured with consideration given to speed. It is assumed that the vehicle 31 illustrated in FIG. 7 is mounted with the distance measurement apparatus 10 illustrated in FIG. 1 and is driven in the direction of the arrow for convenience of description. The left-side of FIG. 7 indicates a case where the distance measurement apparatus 10 scans the object 38 (for example, a wall) in the first mode, and overlaps the scans for N laps. In this example, when the distance to the object 38 located to the rear (or front) of the vehicle 31 is measured and the measured distance is less than the threshold distance and the speed (speed data) of the vehicle 31 detected by the speed sensor 11 is less than the threshold speed, the distance measurement apparatus 10 switches to the second mode as illustrated in the left-side of FIG. 7.

Figure 8:
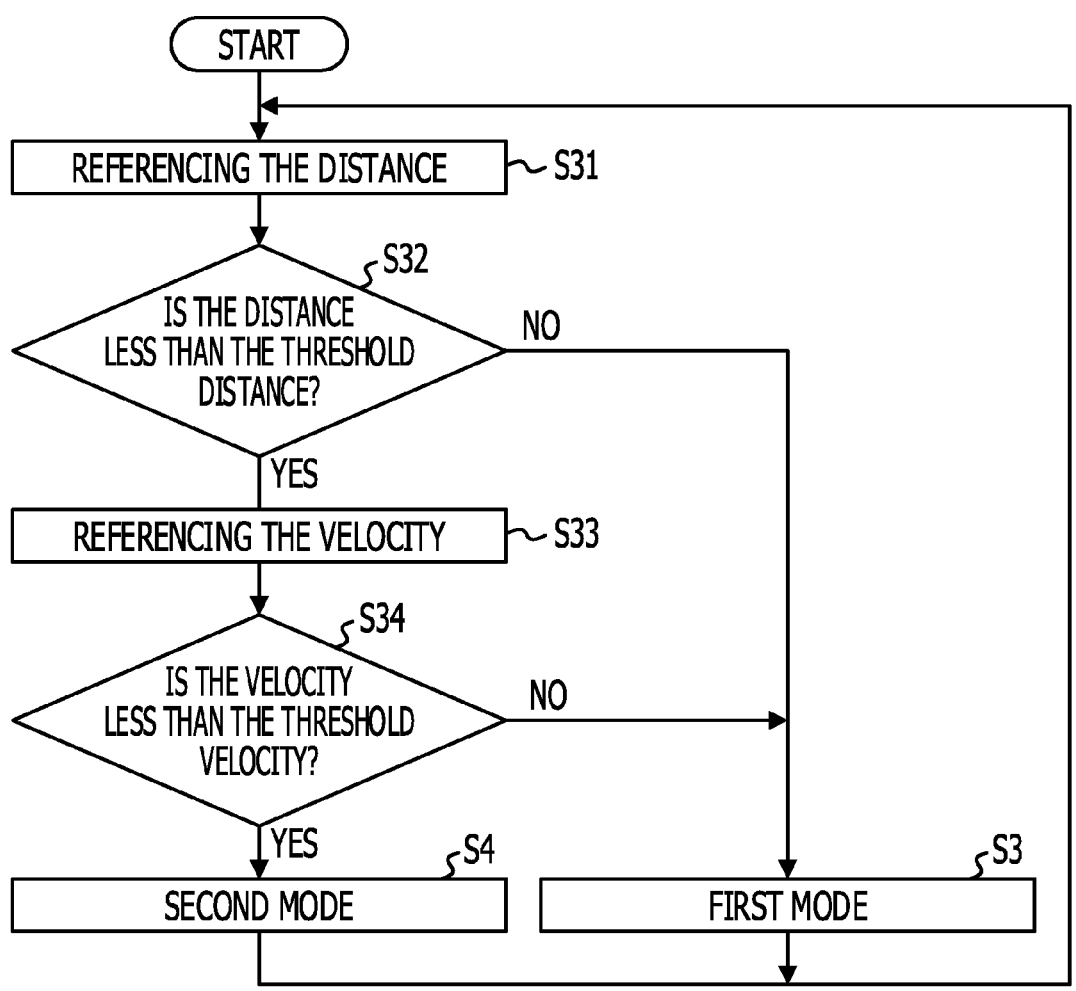
FIG. 8 is a flowchart explaining the operations of the third embodiment.

FIG. 8 is a flowchart explaining the operations of the third embodiment. In FIG. 8, the same steps as those of FIG. 2 are given to similar reference numerals and description thereof is omitted. In FIG. 8, the switching control unit 12 refers to the distance data supplied from the distance measurement circuit 17 at step S31, and determines whether the distance indicated by the distance data is less than or equal to the threshold value at step S32. In this case, the switching control unit 12 may refer to the distance data for a given time and determine whether the shortest distance indicated by the distance data within the given time is less than or equal to the threshold value. When the determination result at step S32 is "YES", the switching control unit 12 refers to the speed data supplied from the speed sensor 11 at step S33 and determines whether the speed indicated by the speed data is less than the threshold speed at step S34. When the determination result at step S34 is "YES", the switching control units 12 supplies a switching signal which designates the light emitting timing for the second mode to the light emission timing control unit 14 at step S4. When the determination result at step S32 or step S33 is "NO", the switching control unit 12 supplies the switching signal which designates the light emitting timing of the first mode to the light emission timing control unit 14 at step S3. Further, steps S31 and S32 may be performed after steps S33 and S34.

According to the present embodiment, the speed is included as a condition of a mode switching in addition to the distance to the object. Therefore, for example, when the vehicle is being parked by reversing at a relatively low speed, the distance between the vehicle and a wall of the parking lot becomes less than the threshold distance and the speed of the vehicle distance becomes less than the threshold speed and thus, the distance measurement apparatus may rapidly switched into the second mode at the time when both conditions for distance and speed are satisfied.

Fourth Embodiment

Figure 9:
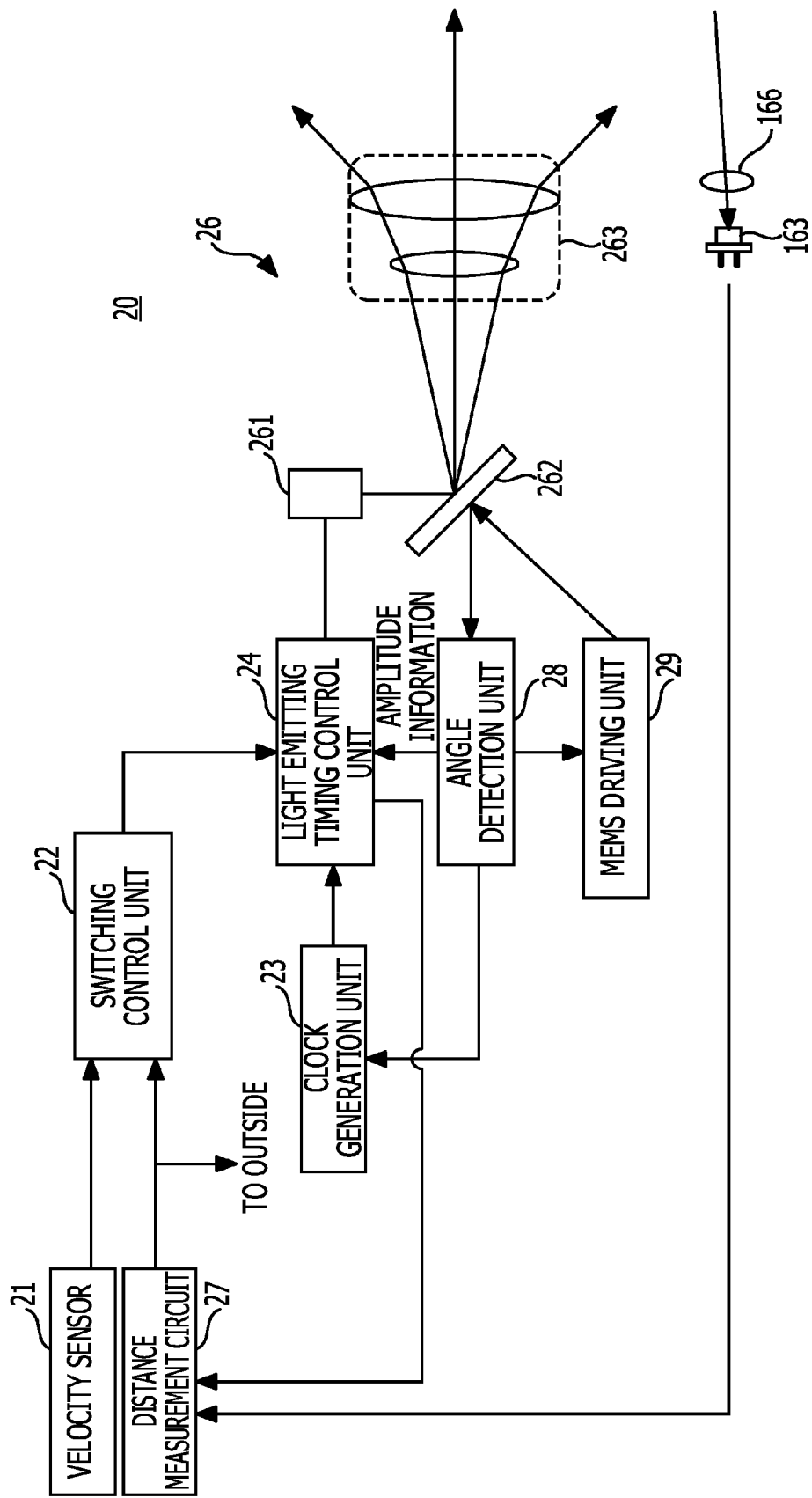
FIG. 9 is a view illustrating an example of a distance measurement apparatus according to a fourth embodiment.

FIG. 9 is a view illustrating an example of a distance measurement apparatus in a fourth embodiment. The distance measurement apparatus adopts a scanning scheme in which a two-dimensional scanning is employed in the present embodiment using a laser which is an example of a light beam.

The distance measurement apparatus 20 illustrated in FIG. 9 includes a speed sensor 21, a switching control unit 22, a clock signal generation unit 23, a light emission timing control unit 24, a light input/output unit 26, a distance measurement circuit 27, an angle detection unit 28, a micro-electric mechanical system (MEMS) driving circuit 29, a condensing lens 166 and a PD 163. The light input/output unit 26 includes an LD and LD driving unit 261, a MEMS mirror 262 and a scanning angle magnifying lens 263. The LD is an example of a light source (that is, a light emitting unit), the PD is an example of a light detection unit (that is, a light receiving unit). The MEMS mirror 262 is an example of an optical scanning unit and has a well-known configuration that is capable of being driven two-dimensionally. The MEMS mirror 262 is able to be driven two-dimensionally with a well-known method and thus, illustration and description of the drive system will be omitted.

The angle detection unit 28 outputs a reference position signal which takes a mirror angle of 0 (zero) degree when the tilt angle of the MEMS mirror 262 (hereinafter, also referred to as a mirror angle) is changed from minus to plus or from plus to minus as a reference position (for example, a reference point) and information about the amplitude of the mirror angle (hereinafter, also referred to as amplitude information). A state where the mirror angle is 0 (zero) degree refers to, for example, a state where the MEMS mirror 262 has not yet been driven by the MEMS driving circuit 29. The amplitude information indicates the difference between the maximum mirror angle and the minimum mirror angle on the basis of the reference position (0 (zero) degrees). Further, the reference position is not limited to a position at which the mirror angle is 0 (zero) degrees.

The MEMS driving circuit 29 supplies a driving signal which determines the vibration amplitude and the vibration frequency to the MEMS mirror 262 and drives the MEMS mirror 262 two-dimensionally in a well-known method based on the amplitude information supplied from the angle detection unit 28. The clock signal generation unit 23 outputs a clock signal generated by using a reference position signal supplied from the angle detection unit 28 as a trigger. The clock signal generation unit 23 may have a function that initiates counting of clock signals using the reference position signal as a trigger to output the clock signal count (that is, a counted number of clock signals). The function of the clock signal counting may be provided in the light emission timing control unit 24.

The light emission timing control unit 24 outputs a light emitting control signal, which controls the light emitting timing of the LD, to the LD driving unit of the LD and LD driving unit 261 at the light emitting timing according to the mode indicated by the switching signal supplied from the switching control unit 22 based on the clock signal supplied from the clock signal generation unit 23 and the amplitude information supplied from the angle detection unit 28. The output timing of the light emitting control signal, as described below, may be determined using a table in which the projection angle of the laser beam with respect to the mirror angle, the clock signal count and the light emitting timing (for example, light emitting pattern) are stored. Accordingly, the laser beam projected from the LD is reflected from the MEMS mirror 262 and projected through the scanning angle magnifying lens 263. The scanning angle magnifying lens 263 has a well-known configuration in which a scanning angle of the laser beam reflected from the MEMS mirror 262 is magnified.

The laser beam reflected from the object (not illustrated) is detected by the PD 163 through the condensing lens 166 and the detected signal output by the PD 163 is supplied to the distance measurement circuit 27. The distance measurement circuit 27 may measure the TOF until the projected laser beam is reflected off and returned from the object and multiply the round trip time by the speed of light to calculate the distance to the object based on the light emitting control signal supplied from the light emission timing control unit 24 and the detect signal supplied from the PD 163. The distance data which indicates the distance calculated by the distance measurement circuit 27 is supplied to the switching control unit 22 and output, for example, to an external device (not illustrated).

In FIG. 9, the speed sensor 21 is provided to detect the speed of the distance measurement apparatus 20 (or, the speed of a vehicle on which the distance measurement apparatus 20 is mounted) and supply speed data indicating the detected speed to the switching control unit 22. The switching control unit 22 may perform control to switch to the first second mode after considering the speed data. The speed sensor 21 may be externally connected to the distance measurement apparatus 20. When the switching control of the mode considering the speed data is not performed, the speed sensor 21 may be omitted.

The one-dimensional scanning in the first embodiment has been expanded to two-dimensional scanning in the present embodiment.

Figure 10:
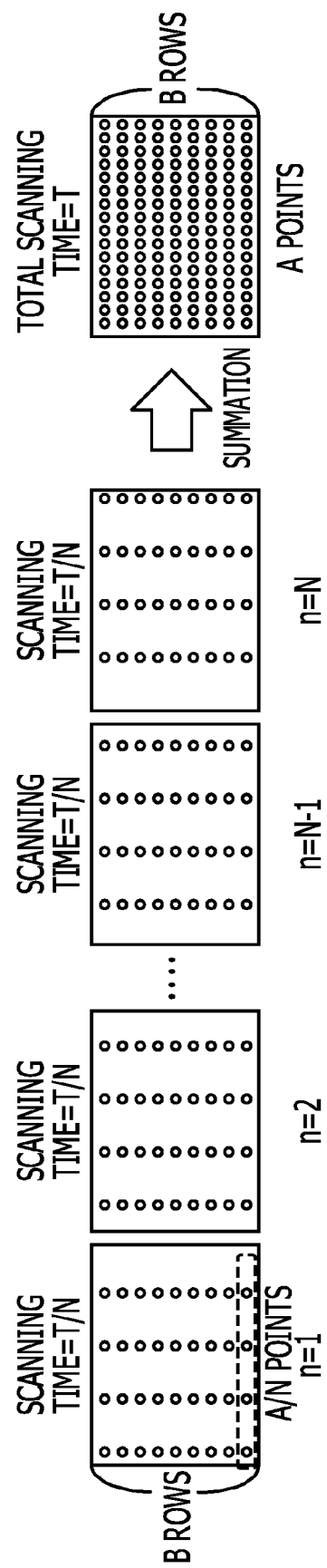
FIG. 10 is a view explaining a light emitting pattern in a first mode.

First, the light emitting pattern in the first mode will be explained. FIG. 10 is a view explaining a light emitting pattern in a first mode. FIG. 10 illustrates a case where one-dimensional scanning similar to FIG. 3 is performed for B (B is an integer which is 2 (two) or more) rows, that is, on B different planes. In the first mode illustrated in FIG. 10, a raster scanning for which the sampling interval is set to every N points in the horizontal direction, and A/N points are sampled in the horizontal direction and B points are sampled in the vertical direction is performed. When one screen is assumed to be scanned in one scan lap, the raster scanning for which the number of samples in the horizontal direction is A/N points and the number of samples in the vertical direction is B points in each screen is performed for N (N is an integer which is 2 (two) or more) screens. In a second screen (n=2) after a first screen (n=1), sampling for which the sample points are deviated from those in the first screen and the sampling interval is set to every N points is performed. That is, in a n-th screen (n=1, 2, . . . , N), sampling for which the projection angle of the laser beam is deviated to make the sample points deviate from those in the n−1th screen and the sampling interval is set to N points, is performed similarly to the embodiment as described above. For example, an initial sample point in the horizontal direction may be deviated in the first screen and the n−1th screen. A method that makes the sample points deviate between the first screen to the n-th screen such that the sampling positions do not overlap is not particularly limited. The point is that any method of making the sample points deviate may be employed as long as the number of samples becomes A samples when the results (that is, the distance data) of the downsampling for N screens are added as illustrated in the right-side of FIG. 10. Accordingly, when a scanning speed for one screen is set to N times the scanning speed which corresponds when the number of samples in the horizontal direction is A/N samples and the number of samples in the vertical direction is B samples for one screen, the number of samples in the horizontal direction and in the vertical direction becomes A samples and B samples, respectively, when the results (for example, the distance data) of sampling for N screens are added, as illustrated in right-side of FIG. 10. In other words, when the scanning time for one screen is defined as T when the number of samples in the horizontal and the vertical directions for one screen is A×B samples, as illustrated in the right-side of FIG. 10, the scanning time for each screen is T/N time when the number of samples in the horizontal direction is A/N samples and the number of samples in the vertical direction is B samples for each screen in order to make the number of samples in the horizontal direction and the vertical direction be A×B samples which is the same as when the results of sampling for N screens are added. The distance measurement circuit 27 calculates a distance in the first mode based on the samples in which the results of the sampling for N screens are added.

The light emission timing control unit 24 may determine an output timing of the light emitting control signal using a table of light emitting patterns in which the projection angle to the mirror angle of the laser beam and the light emitting timing (that is, a light emitting pattern) are stored. FIG. 11 is a view illustrating an example of the table of light emitting patterns in the fourth embodiment. The light emitting pattern table may be provided within the light emission timing control unit 24 or may be stored in a storage unit (not illustrated) externally installed and accessible by the light emission timing control unit 24. The light emission timing control unit 24 may obtain the mirror angle of the MEMS mirror 262 from the amplitude information supplied from the angle detection unit 28 and use the light emitting pattern table similarly to FIG. 11 to emit the laser beam at equal angular intervals. FIG. 11 illustrates an example in which the light emitting pattern table stores the projection angle of the laser beam ⊖(deg) and the light emitting pattern denoted by a black circle for n=1 to N with respect to the mirror angle θ(deg).

Figure 12:
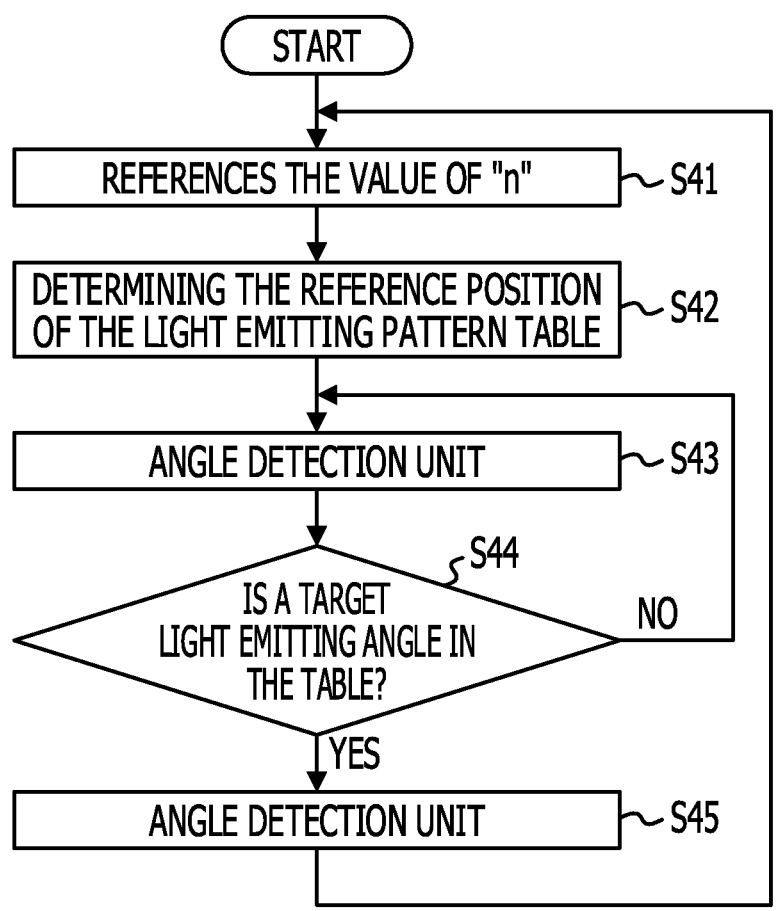
FIG. 12 is a view explaining the operations in the first mode of the fourth embodiment.

FIG. 12 is a view explaining the operations in the first mode of the fourth embodiment. In FIG. 12, the light emission timing control unit 24 refers to the value of "n" based on the clock signal from the clock signal generation unit 23 at step S41 and determines the reference position of the same value of "n" among the light emitting pattern table at step S42. The light emission timing control unit 24 obtains the mirror angle of the MEMS mirror 262 based on the amplitude information from the angle detection unit 28 at step S43, and determines whether the mirror angle corresponding to the reference position of the value of "n" determined as described above is the obtained mirror angle at step S44. When the determination result at step S44 is "NO", the process goes back to step S43. However, the determination result at step S44 is "YES", the light emission timing control unit 24 recognizes that the light emitting timing has arrived and outputs the light emitting control signal to the LD and LD driving unit 261 at step S45, and the process goes back to step S41.

The light emission timing control unit 24 may correct the light emitting timing determined based on the light emitting pattern table based on the amplitude information supplied from the angle detection unit 28. Specifically, the light emission timing control unit 24 may calculate the clock signal count corresponding to the mirror angle indicated by the amplitude information and output the light emitting control signal when the calculated clock signal count coincides with the clock signal count of clock signals supplied from the clock signal generation unit 23. The correction for the light emitting timing described above is performed and thus, even when the amplitude variation of the mirror angle of the MEMS mirror 262 caused by, for example, temperature variation, is generated, it is possible to prevent an actual projection angle of the laser beam from being deviated from the projection angle set in the light emitting pattern table.

Figure 13:
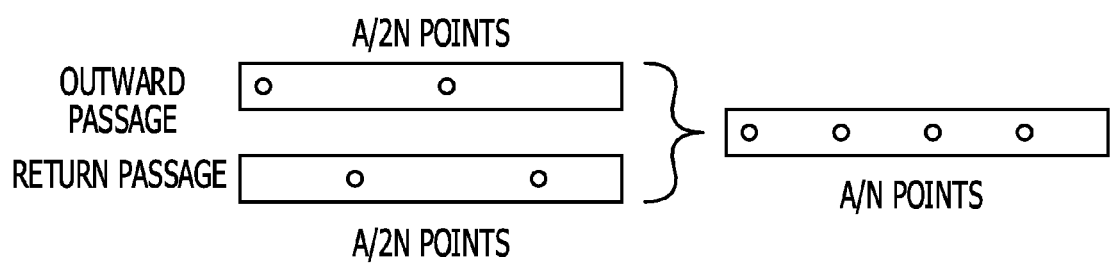
FIG. 13 is a view explaining the light emitting pattern for a single scan.

In FIG. 10, for convenience of description, description was made of a case where sampling in the horizontal direction is performed on an outward leg among a round trip scan in the horizontal direction of the laser beam, but sampling in the horizontal direction may be performed on both the outward leg and the return leg. FIG. 13 is a view explaining a light emitting pattern for a single scan when the sampling in the horizontal direction is performed on both the outward leg and the return leg. As illustrated in FIG. 13, the number of samples in the horizontal direction in each screen is set to A/2N samples in a single outward leg and A/2N samples in a single return leg and thus, the number of samples in the horizontal direction becomes A/N samples in a single round trip.

Figure 14:
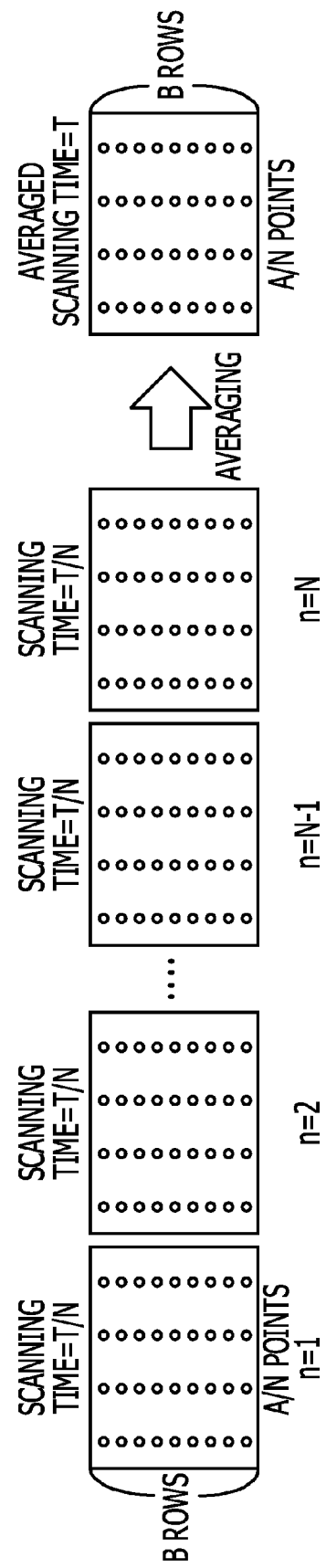
FIG. 14 is a view illustrating an example of the light emitting pattern in a second mode.

Next, the light emitting pattern in a second mode will be described. FIG. 14 is a view illustrating an example of the light emitting pattern in a second mode. FIG. 14 illustrates a case where one-dimensional scanning, which is the same as that of FIG. 4, is performed with respect to B (for example, B is an integer which is two or more) rows, that is, performed on B different planes. In the second mode illustrated in FIG. 14, raster scanning for which the sampling interval is set to every N points in the horizontal direction, and A/N points are sampled in the horizontal direction and B points are sampled in the vertical direction is performed. When one screen is assumed to be scanned in one scan lap, the raster scanning for which the number of samples in the horizontal direction is A/N points and the number of samples in the vertical direction is B points in each screen, is performed for N (for example, N is an integer which is two or more) screens. In a second screen (n=2) after a first screen (n=1), sampling is performed for which the sample points are overlapped with those in the first screen and the sampling interval is set to N points. That is, for a first screen to a n-th screen, sampling for which the projection angles of the laser beam are coincided with each other to overlap the sample points in the respective screens and the sampling interval is set to every N points, is performed similarly to the embodiments as described above. Further, the distance measurement circuit 27 may obtain an average value of the resulting distance data of the sampling for N laps and uses the obtained average as the distance data to further enhance the accuracy of a measured distance as illustrated in the right-side of FIG. 14.

Switching between the first mode and the second mode may be performed using any one of methods of FIG. 2, FIG. 6 and FIG. 8. As described above, when the measured distance to the object is greater than or equal to the threshold value, the mode is switched to a first mode in which priority is given to the scanning angle resolution, and when the measured distance is less than the threshold value, the mode is switched to a second mode in which priority is given to the accuracy of a measured distance. Accordingly, the measurement may be performed according to a measurement environment of the distance measurement apparatus 20. The threshold value may be stored in a storage unit (not illustrated) installed within the distance measurement circuit 27, a storage unit (not illustrated) externally installed and accessible by the distance measurement circuit 27, or may be input to the distance measurement circuit 27 from an external source.

Fifth Embodiment

The distance measurement apparatus according to a fifth embodiment may have the same configuration as that of FIG. 9. The distance measurement apparatus according to the fifth embodiment adopts a scanning scheme in which a two-dimensional scanning is employed that uses a laser which is an example of a light beam.

The light emission timing control unit 24 of the present embodiment is the same as that of the fourth embodiment except that the light emitting pattern table used for determining the output timing of the light emitting control signal by the light emission timing control unit 24 further stores the clock signal count.

FIG. 15 is a view illustrating an example of a table of light emitting patterns in the fifth embodiment. In FIG. 15, the same portions as those of FIG. 11 are given to similar reference numerals and description thereof will be omitted. The light emission timing control unit 24 may obtain the mirror angle of the MEMS mirror 262 from the amplitude information supplied from the angle detection unit 28 and use the light emitting pattern table similarly to FIG. 15 to emit the laser beam at equal angular intervals. FIG. 15 illustrates an example in which the light emitting pattern table stores the projection angle ⊖(deg) of the laser beam, the clock signal count for the outward leg and the light emitting pattern denoted by a black circle for n=1 to N with respect to the mirror angle θ(deg). When sampling is performed only in the outward leg of the round trip scans in the horizontal direction of the laser beam, the sampling is performed every N points in each outward leg.

Figure 16:
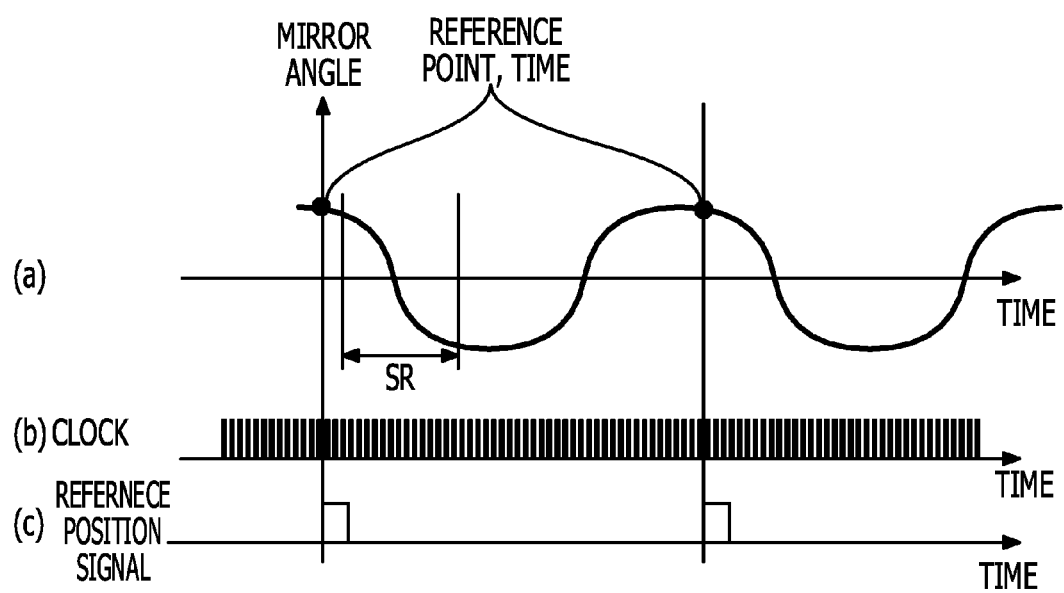
FIG. 16 is a view explaining a clock signal count for an outward leg.

FIG. 16 is a view explaining a clock signal count for an outward leg. In FIG. 16, (a) denotes the mirror angle of the MEMS mirror 262 in a unit, (b) denotes clock signals generated by the clock signal generation unit 23 in a unit, (c) denotes the reference position signal, output by the angle detection unit 28, which is a trigger to start counting of clock signals in the clock signal generation unit 23, each denoted with an arbitrary unit. Further, the SR denotes a sampling area.

The light emission timing control unit 24 may refer to the clock signal count which corresponds to the mirror angle indicated by the amplitude information stored in the light emitting pattern table and output the light emitting control signal at a time when the calculated clock signal count coincides with the clock signal count of clock signals supplied from the clock signal generation unit 23. The correction for the light emitting timing described above is performed and thus, even when the amplitude variation of the mirror angle of the MEMS mirror 262 caused by, for example, temperature variation, is generated, it is possible to prevent an actual projection angle of the laser beam from deviated from the projection angle set in the light emitting pattern table.

In FIG. 15, for convenience of description, a case where sampling is performed only in the outward leg of the round trip scans in the horizontal direction of the laser beam was described, and the count of clock signals corresponds to the count for the outward leg, but sampling in the horizontal direction may be performed for both outward leg and return leg.

FIG. 17 is a view illustrating another example of the table of light emitting patterns in the fifth embodiment. In FIG. 17, the same portions as those of FIG. 15 are illustrated with similar reference numerals and description thereof will be omitted. The light emission timing control unit 24 may obtain the mirror angle of the MEMS mirror 262 from the amplitude information supplied from the angle detection unit 28 and use the light emitting pattern table similarly to FIG. 17 to project the laser beam at equal angular intervals. FIG. 17 illustrates an example in which the light emitting pattern table stores the projection angle of the laser beam Θ(deg), the clock signal counts for the outward leg and the return leg and the light emitting pattern denoted by a black circle for n=1 to N with respect to the mirror angle θ(deg). When sampling is performed in both the outward leg and the return leg of the round trip scans in the horizontal direction of the laser beam, sampling is performed every 2N points in the outward leg and the return leg.

Figure 18:
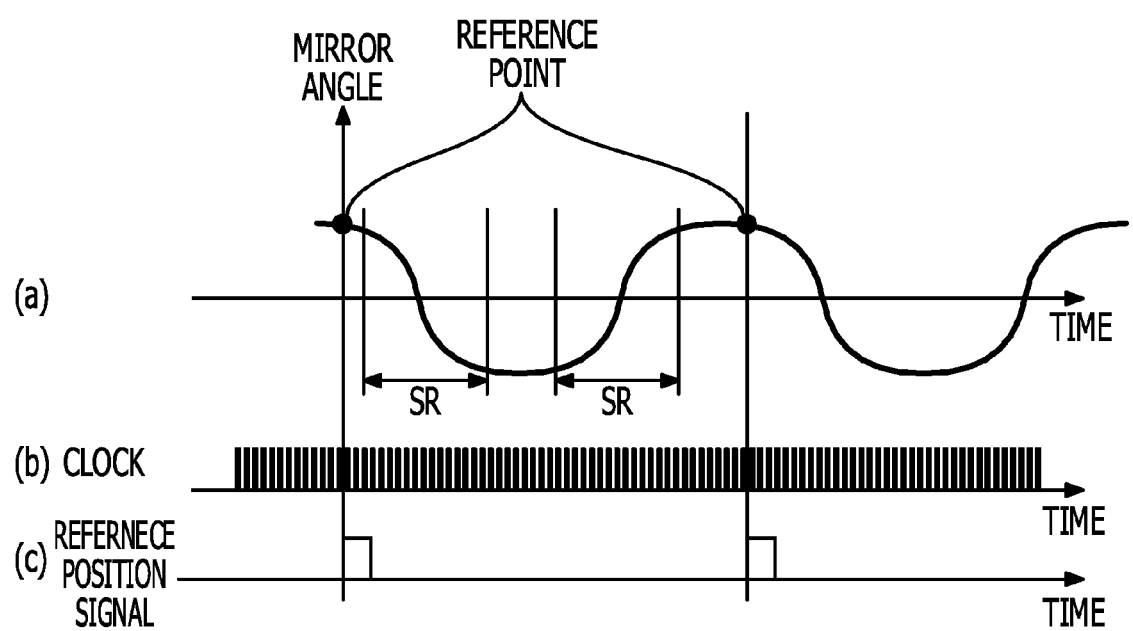
FIG. 18 is a view explaining a clock signal count for an outward leg and a return leg.

FIG. 18 is a view explaining a clock signal count for the outward leg and the return leg. In FIG. 18, (a) denotes the mirror angle of the MEMS mirror 262, (b) denotes clock signals generated by the clock signal generation unit 23, and (c) denotes the reference position signal output by the angle detection unit 28 to be a trigger for initiation of the counting of clock signals in the clock signal generation unit 23, each denoted by an arbitrary unit. Further, the SR denotes a sampling area.

Figure 19:
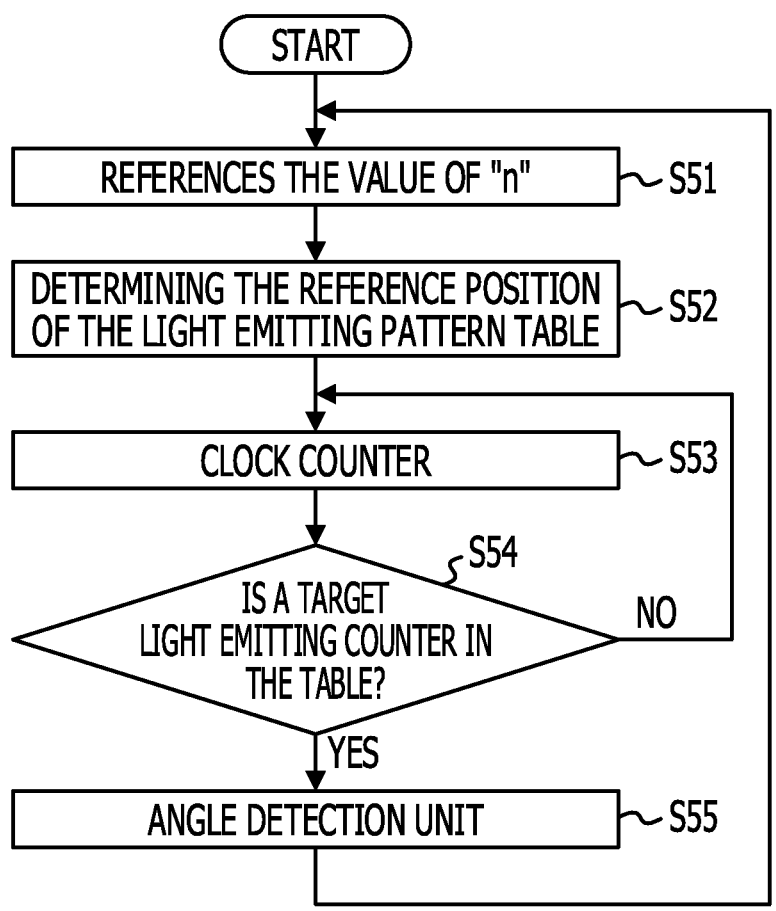
FIG. 19 is a view explaining the operations in the first mode of the fifth embodiment.

FIG. 19 is a view explaining operations in the first mode of the fifth embodiment. In FIG. 19, the light emission timing control unit 24 refers to the value of "n" based on the clock signal from the clock signal generation unit 23 at step S51 and determines the reference position of the same value of "n" among the light emitting pattern table illustrated in FIG. 17 at step S52. The light emission timing control unit 24 obtains the clock signal count from the clock signal generation unit 23 at step S53 and determines whether the clock signal count corresponding to the reference position of the value of "n" determined as described above is the obtained clock signal count at step S54. When the determination result at step S54 is "NO", the process goes back to step S53. However, the determination result at step S54 is "YES", the light emission timing control unit 24 recognizes that the light emitting timing has arrived and outputs the light emitting control signal to the LD and LD driving unit 261 at step S55, and the process goes back to step S51.

Figure 20:
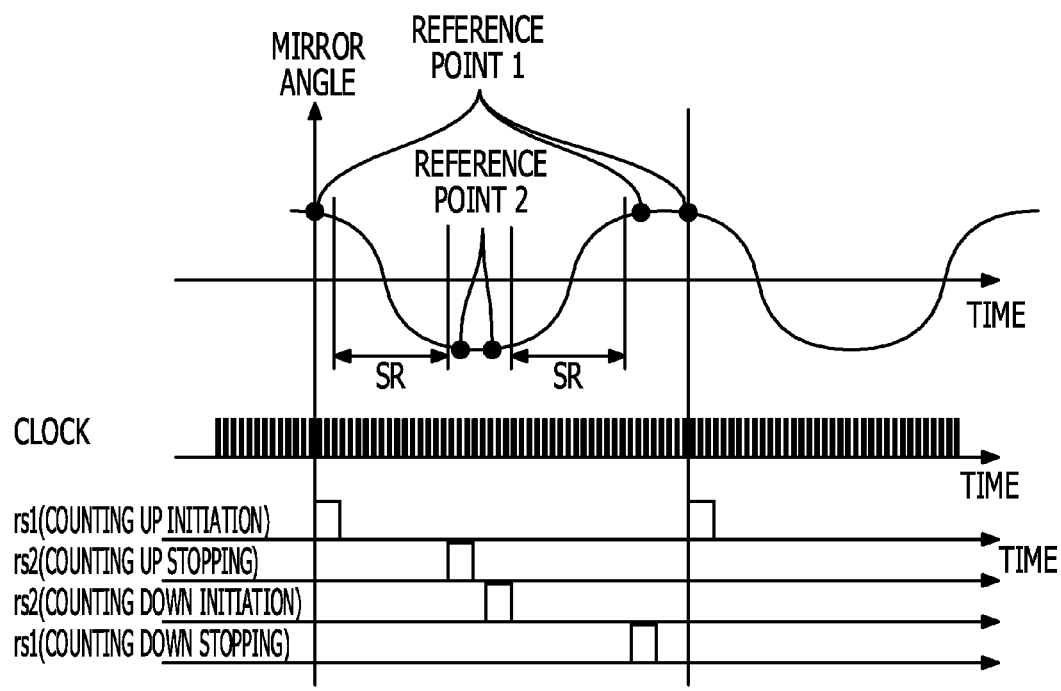
FIG. 20 is a view explaining another example of the clock signal count for the outward leg and the return leg.

Further, when sampling is performed in both the outward leg and the return leg of the round trip scans in the horizontal direction of the laser beam, one clock signal and two reference positions are defined for the MEMS mirror 262 with respect to the sample points in the horizontal direction, as illustrated in FIG. 20, a counting up or a counting down of clock signal is performed at each reference position such that the light emitting pattern table may be commonly used for the outward leg and the return leg.

FIG. 20 is a view explaining another example of the clock signal count for the outward leg and the return leg. In FIG. 20, (a) denotes the clock signal, (b) denotes the first reference position signal rs1 that serves as a trigger to start the counting up of clock signals, (c) denotes the second reference position signal rs2 that serves as a trigger to stop the counting up of clock signals, (d) denotes the second reference position signal rs2 that serves as a trigger to start the counting down of the clock signals, and (e) denotes the first reference position signal rs1 serving as a trigger for stopping of the counting down of the clock signals, each denoted by an arbitrary unit. Further, the SR denotes a sampling area.

As illustrated in FIG. 20, when the mirror angle of the MEMS mirror 262 reaches a first reference point 1 and the angle detection unit 28 outputs the first reference position signal rs1 of (b), the corresponding first reference position signal rs1 is used as a trigger to start the counting up of the clock signal, in the outward leg in the horizontal direction of the laser beam. When the mirror angle of the MEMS mirror 262 reaches a first reference point 2 and the angle detection unit 28 outputs the second reference position signal rs2 of (c), the corresponding second reference position signal rs2 is used as a trigger to stop the counting up of the clock signal. Further, when the mirror angle reaches the next reference point 2 and the angle detection unit 28 outputs the second reference position signal rs2 of (d), the corresponding second reference position signal rs2 is used as a trigger to start the counting down of the clock signal. When the mirror angle reaches the next reference point 1 and the angle detection unit 28 outputs the first reference position signal rs1 of (e), the corresponding first reference position signal rs1 is used as a trigger to stop the counting down of the clock signal.

Further, the light emitting pattern in the second mode is similar to as in the fourth embodiment and thus, description thereof will be omitted.

Figure 21:
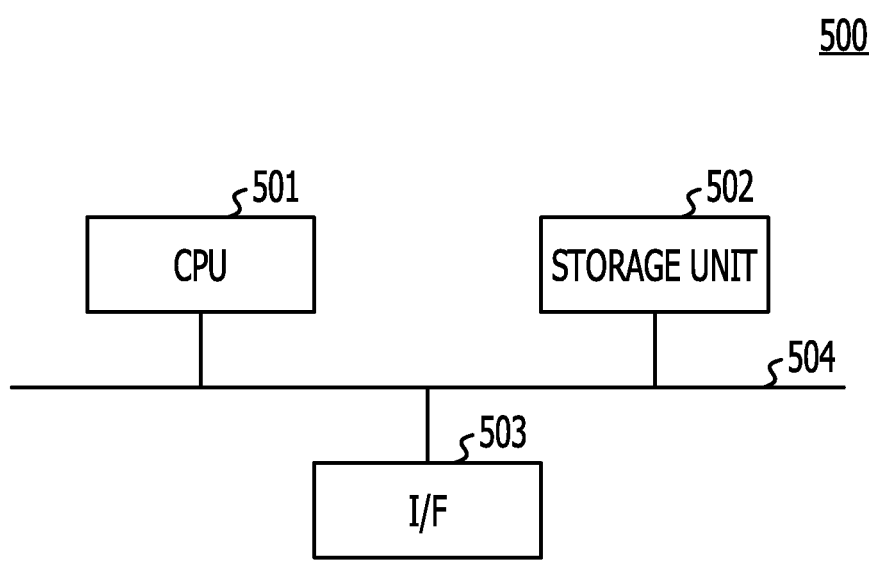
FIG. 21 is a block diagram illustrating an example of a computer system performing a distance measurement process.

FIG. 21 is a block diagram illustrating an example of a computer that executes a distance measurement process. A computer 500 illustrated in FIG. 21 has a configuration in which a central processing unit (CPU) 501 that is an example of a processor, a storage unit 502, and an interface (I/F) 503 are connected with each other via a bus 504. The storage unit 502 stores a program executed by the CPU 501 and various data such as, for example, data for the light emitting pattern table described above, threshold values, and intermediate results of operation executed by the CPU 501. The I/F 503 communicably connects the computer 500 with an external apparatus through a wired or wireless connection, or through a combination of wired and wireless connections.

The program stored in the storage unit 502 may include a program that causes the CPU 501 to execute the distance measurement process. The storage unit 502 may be formed with a computer readable storage medium including, for example, a magnetic recording medium, an optical recording medium, an opto-magnetic recording medium, or a semiconductor storage device. The program may be a program which causes the computer 500 to function as the switching control unit 12, the light emission timing control unit 14 and the distance measurement circuit 17 or to function as the switching control unit 22, the light emission timing control unit 24, and the distance measurement circuit 27 illustrated in FIG. 9. Further, the program may cause the computer 500 to function as the rotation control unit 15 or to function as at least one of the angle detection unit 28 and the MEMS driving circuit 29 illustrated in FIG. 9.

In the embodiments described above, a situation where a distance measurement apparatus is mounted on a vehicle is described for the convenience of description. However, the disclosed distance measurement apparatus may be used for other purposes such as, for example, measuring the distance from the a person who measures to an object, investigating the shape of ground structures that is performed from the sky by being mounted on, for example, a balloon, detecting a person between a carriage and an opening/closing door on the platform of the railway, or as a monitoring system, without being limited to detection of an obstacle. As described above, the distance measurement apparatus may be held by a person, or mounted on a movable apparatus or fixed-type apparatus.

According to the disclosed distance measurement apparatus, a mode is switched between a first mode or a second mode depending on the situation and thus, the accuracy of a measured distance and the scanning angle resolution may be enhanced with a relatively simple and less expensive circuit, without causing a delay of data update and without using an expensive laser.

The following claims are disclosed with respect to the embodiments described above.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention has (have) been described in detail, it should be understood that the various changes, substitutions, and alterations could be made hereto without departing from the spirit and scope of the invention.

What is claimed is:

1. A distance measurement apparatus that scans an object by using a light beam, comprising:
    a processor configured to
    obtain a distance to an object based on a light beam reflected from the object;
    sample positions for N laps with a sampling interval of every N points, N being an integer of two or more, and in a second lap after a first lap, sample positions are deviated from those in the first lap; and
    designate a first mode which controls a projection angle of the light beam so that the sampling positions in a given number of successive scans do not overlap when the distance to the object is greater than or equal to a threshold value, and designate a second mode which controls the projection angle of the light beam so that the sampling positions overlap in each scan when the distance to the object is less than the threshold value,
    wherein the processor is configured to obtain, in the first mode, the distance to the object based on distance data in which data for sampling positions in a given number of scans are added, and obtain, in the second mode, the distance to the object based on an averaged distance data for data for sampling positions in which each scan overlaps.

2. The distance measurement apparatus according to claim 1, wherein the processor switches between the first mode and the second mode based on a comparison result between the distance and the threshold value.

3. The distance measurement apparatus according to claim 2, wherein the processor performs the switching when a size relationship between the distance to the object and the threshold value changes and then the size relationship does not change in a plurality of successive scans.

4. The distance measurement apparatus according to claim 2, wherein the processor switches to the second mode when the distance to the object is less than the threshold value and when the speed of the distance measurement apparatus is less than a threshold speed.

5. The distance measurement apparatus according to claim 1, wherein the processor configured to scan the light beam one-dimensionally.

6. The distance measurement apparatus according to claim 1, wherein the processor configured to scan the light beam two-dimensionally.

7. A non-transitory computer-readable storage medium storing a program that, when executed by a computer, performs a method to measure the distance to an object by using a light beam and using a processor, the method comprising:
    sampling positions for N laps with a sampling interval of every N points, N being an integer of two or more, and in a second lap after a first lap, sample positions are deviated from those in the first lap;
    designating a first mode which controls a projection angle of a light beam to be scanned on an object so that sampling positions in a given number of successive scans do not overlap when a distance to the object measured by a distance measurement circuit is greater than or equal to a threshold value;
    designating a second mode which controls the projection angle of the light beam so that the sampling positions overlap in each scan when the distance to the object measured by the distance measurement circuit is less than the threshold value;
    obtaining, in the first mode, the distance to the object based on distance data in which data for sampling positions in a given number of scans are added together; and
    obtaining, in the second mode, the distance to the object based on averaged distance data for data for sampling positions in which each scan overlaps.

8. The non-transitory computer-readable storage medium according to claim 7, wherein the method further comprising:
    switching between the first mode and the second mode based on a comparison result between the distance and the threshold value.

9. The non-transitory computer-readable storage medium according to claim 8, wherein the switching is performed when a size relationship between the distance and the threshold value changes and then the size relationship does not change in a plurality of successive scans.

10. The non-transitory computer-readable storage medium according to claim 8, wherein the switching is performed to switch to the second mode when the distance to the object is less than the threshold value and when the speed of the distance measurement apparatus is less than a threshold speed.

11. A distance measurement method, comprising:
measuring a distance to an object by means of a distance measurement circuit of a distance measurement apparatus and by scanning a light beam;
sampling positions for N laps with a sampling interval of every N points, N being an integer of two or more, and in a second lap after a first lap, sample positions are deviated from those in the first lap;
designating a first mode which controls a projection angle of the light beam so that sampling positions in a given number of successive scans do not overlap, when the distance to the object is greater than or equal to a threshold value, by using the processor;
designating a second mode which controls the projection angle of the light beam so that the sampling positions overlap in each scan, when the distance to the object is less than the threshold value, by using the processor;
obtaining, in the first mode, the distance to the object based on distance data in which data of sampling positions in a given number of scans are added together; and
obtaining, in the second mode, the distance to the object based on averaged distance data of for data for sampling positions in which each scan overlaps.

12. The distance measurement method according to claim 11, further comprising: switching between the first mode and the second mode, based on a comparison result between the distance, measured by using the processor, and the threshold value.

13. The distance measurement method according to claim 12, wherein the switching is performed when a size relationship between the measured distance and the threshold value changes and then the size relationship does not change in a plurality of successive scans.

14. The distance measurement method according to claim 12, wherein the switching is performed to switch to the second mode when the measured distance is less than the threshold value and when the speed of the distance measurement apparatus is less than a threshold speed.

* * * * *